Nov. 26, 1957  H. N. BEVERIDGE ET AL  2,814,760
SWEEP CIRCUITS

Filed April 14, 1955  2 Sheets-Sheet 1

INVENTORS
HAROLD N. BEVERIDGE
RICHARD M. DUNHAM
BY
ATTORNEY

INVENTORS
HAROLD N. BEVERIDGE
RICHARD M. DUNHAM
BY
ATTORNEY

United States Patent Office 2,814,760
Patented Nov. 26, 1957

2,814,760

SWEEP CIRCUITS

Harold N. Beveridge, Kenilworth, Ill., and Richard M. Dunham, Newton, Mass., assignors to Raytheon Manufacturing Company, Waltham, Mass., a corporation of Delaware Application April 14, 1955, Serial No. 501,415

8 Claims. (Cl. 315—27)

This invention relates to sweep circuits for cathode ray tubes using magnetic deflection such as in the PPI type radar indicators.

For radars for use on small vessels, such as fishing boats, it is important to keep the equipment as simple as possible so that it will be inexpensive to build, yet it must also be accurate and reliable. One of the most useful radar presentations is the PPI. When this presentation is attained by the usual means, the apparatus required is likely to be complicated and expensive to build. Such a circuit may require as many as 3 to 6 tubes or tube functions. Where short ranges are of interest, a linear sweep circuit not requiring a gating pulse with a very short rise time is desirable in the interest of simplicity and economy. Also, the pulse for this purpose should be suitable for keying other sections of the circuit such as the intermediate frequency and video amplifiers.

These objects are accomplished in the circuits of the present invention by the use of a capacitive feedback between the plate and grid of a tetrode or pentode, in which the feedback capacitor is shunted by a resistor, as is also the deflection coil in the plate circuit in the case of that modification of the circuit used for short ranges. In the long range case, only a portion of the feedback capacity is shunted by a resistor and an additional resistor is placed in series with the deflection coil and a positive bias is applied to the control grid. The gating pulse is applied to either the screen grid or the suppressor grid in a positive-going form. In practical equipments, switching is provided to switch from one circuit to the other depending on the range desired. Where additional sweep power is required, a cathode follower is inserted in series with the control grid, the source of biasing potential and the feedback network. Greater linearity of the sweep over a great variety of ranges is obtained by placing a diode between a portion of the gating potential and the control grid in such a manner that it conducts only when the pulse is off.

Other and further advantages of this invention will be apparent as the description progresses, reference being had to the accompanying drawings wherein:

Fig. 1 is a schematic diagram of the circuit of one embodiment of the invention;

Figs. 2a, b, c and d show graphs of the variation of the screen voltage, the plate voltage, a control grid voltage, and the plate current, respectively, with time, for the circuit of Fig. 1;

Fig. 3 is a schematic diagram of the circuit of another embodiment of the invention;

Figs. 4a, b, c and d show graphs of the variation of the screen voltage, the plate voltage, the control grid voltage, and the plate current, respectively, with time, for the circuit of Fig. 3;

Figure 1:
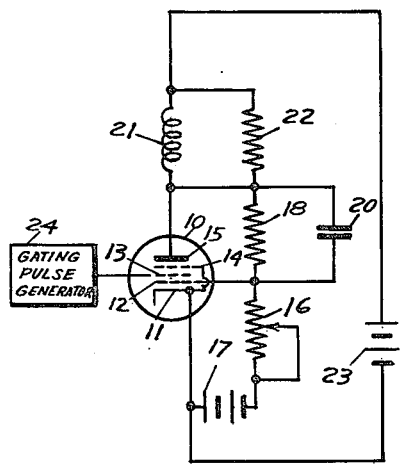

In Fig. 1, the reference numeral 10 designates a pentode having a cathode 11, a control grid 12, a screen grid 13, a suppressor grid 14 and an anode 15. The control grid 12 is connected to the cathode 11 through a variable resistor 16 and a source 17 of negative potential and to the plate 15 through a resistor 18 shunted by a capacitor 20. The plate 15 is also connected to the cathode 11 through the deflection coil 21 of a cathode ray tube (not shown) shunted by a resistor 22 and in series with a source 23 of positive potential. The screen grid 13 is connected to a source 24 of gating pulses. The suppressor grid 14 is connected to the cathode.

Figure 2:
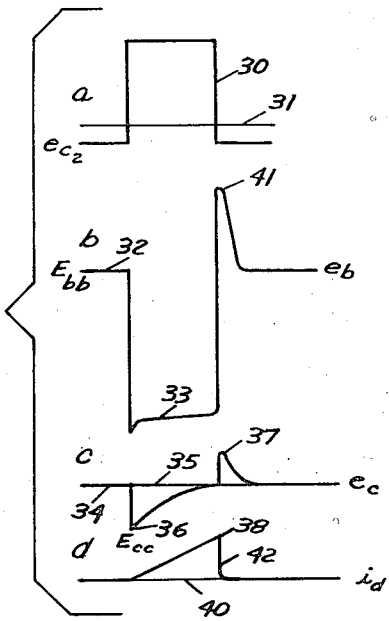

The operation of the circuit can best be understood by reference to the graphs of Figs. 2a, b, c and d. In Fig. 2a, the curve 30 represents the variation of the screen voltage, plotted vertically, with time, plotted horizontally along the line 31. It will be noted that the screen potential is initially sufficiently negative to cut off the tube 10 and rises sharply to a level that permits the tube to conduct the required peak deflection coil current. This pulse must supply the full screen current. The gating pulse may also be applied to the suppressor grid instead of to the screen grid, in which case a fixed potential is applied to the screen grid with the same result. When the tube conducts, the plate voltage drops from a level 32, representing the supply potential $E_{bb}$, to a lower level 33.

Prior to the application of the gating voltage, the grid voltage $e_c$ is held near ground as can be seen by reference to Fig. 2c in the region 34 where control grid voltage is plotted vertically with reference to time, plotted horizontally along the line 35. This is due to grid-to-cathode conduction. As the plate voltage drops, current flows through resistor 22 and the control grid voltage drops with it to the point 36 representing a value compatible with the instantaneous plate voltage (most negative portion of wave form 33) and the instantaneous plate current (the current through resistor 22 minus the current through resistor 18). The current in coil 21 at this instant is zero.

As current starts to build up in coil 21 due to the voltage across it (wave form 33), the voltage drop tends to decrease causing the plate voltage to rise. This effect is minimized by the effect of resistors 18 and 16 which couple this positive going voltage to the control grid of the wave form shown in Fig. 2c. The effect is to maintain an essentially constant voltage drop across coil 21. Assuming negligible resistance in coil 21, this results in a linear sweep.

The purpose of capacitor 20 is merely to compensate for the input and stray capacity at the junction of 16 and 18 and is effective only during the intitial period of the sweep.

While the gate pulse is on, the plate voltage is held reasonably constant by the voltage feedback through resistors 16 and 18 so that the current in the deflection coil 21 rises linearly to a point 38, as shown in Fig. 2d, where the current in the coil is plotted vertically with respect to time which is plotted horizontally along the line 40.

The resistance of the resistor 16 controls the amplitude of the driving voltage and, consequently, the sweep slope. The capacity of the capacitor 20 influences the linearity of the sweep start by altering the high frequency response of the feedback loop. In practice, the value of the capacitor 20 is chosen to produce some overshoot in the plate voltage indicated by the region 41 of the curve in Fig. 2b. This overshoot compensates for stray and distributed capacity in the deflection coil circuit. The resistor 22 is provided to limit the voltage transient produced across the deflection coil 21 by the rapid decay in the current at the end of the sweep as indicated by the region 42 of the graph in Fig. 2d.

Figure 3:
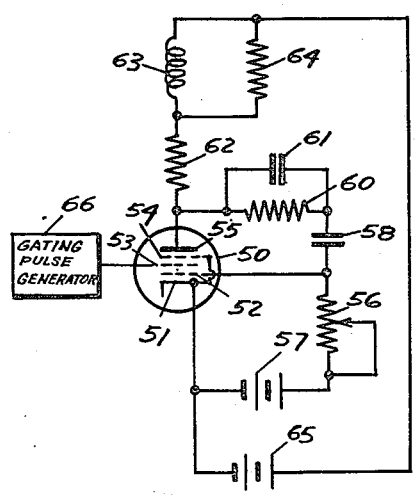

In Fig. 3 the reference numeral 50 designates a pentode having a cathode 51, a control grid 52, a screen grid 53, a suppressor grid 54, and an anode 55. The control grid 52 is connected to the cathode 51 through a variable resistor 56 of resistance $R_2$ and a source 57 of positive potential $E_{cc}$, and is coupled to the plate 55 through a capacitor 58 of capacity $C_1$ and a resistor 60 of resistance $R_1$ shunted by a capacitor 61 of capacity $C_2$. The anode 55 is also connected to the cathode 51 through a resistor 62 of resistance $R_4$, the deflection coil 63 of inductance L of a cathode ray tube (not shown) shunted by a resistor 64 of resistance $R_3$ and a source 65 of positive potential $E_{bb}$. The screen grid 53 is connected to a source 66 of gating pulses of a peak voltage $E_{c2}$.

Figure 4:
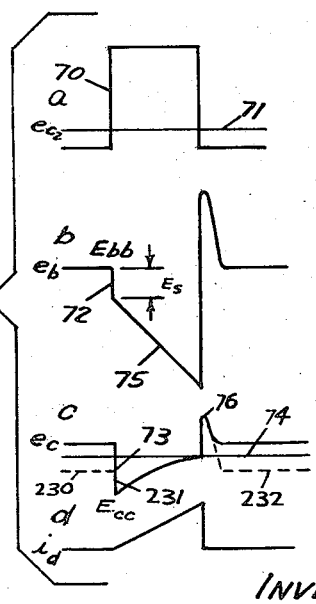

The operation of the circuit can best be understood by reference to Figs. 4a, b, c and d. In Fig. 4a the curve 70 represents the variation of the screen voltage plotted vertically, with time, plotted horizontally along the line 71. As before, the screen potential is initially sufficiently negative to cut off the tube 50 and rises sharply to a level that permits the tube to conduct the required current. This gating pulse may be applied to the suppressor grid 54 instead of to the screen grid 53.

Upon application of the gating waveform 70, current flows in the resistors 64, 62 and 60. The plate voltage falls, as shown by the vertical line 72 in the graph of Fig. 4b, where plate voltage is plotted vertically with respect to time, which is plotted horizontally. This drop in plate voltage drives the grid voltage $e_c$ nearly to cut-off, as shown by the vertical line 73 in the graph in Fig. 4c, where grid voltage is plotted vertically with respect to time, which is plotted horizontally along the line 74. If the grid supply voltage $E_{cc}$ from the source 57 is large compared to the change in grid voltage during the sweep, then to a first approximation $i_0$, the current flowing into the capacitor 58 and resistor 60 may be considered constant, then neglecting the effect of the capacitor 61.

$$e_b = E_{bb} - i_0 R_1 - \frac{i_0 t}{C_1} \quad (1)$$

$$e_b = E_{bb} - \frac{E_{cc} R_1}{R_2} - \frac{E_{cc} t}{R_2 C_1} \quad (1a)$$

From these formulas it can be seen that the output voltage is comprised of a step represented by the line 72 in Fig. 4b of an amplitude of $E_s$ and a linear saw tooth represented by the portion 75 of the same curve.

From Equation 1 it would be expected that reducing the resistance $R_1$ of resistor 60 to zero would result in a linear saw tooth with no step. Actually, this is not the case, since initially the grid 52 must be driven negative by a finite negative step in plate voltage. If resistor 64, $R_3$, were absent, this step would appear across the deflection coil and on the longer ranges would be greater than the desired $Ldi/dt$. Thus on the longer ranges the resistance $R_1$ of resistor 60 is reduced to zero and the resistance $R_3$ of resistor 64 is determined by the relationship, $$R_3 = \frac{R_4 L di/dt}{E_s - L di/dt} \quad (2)$$

where $E_s$ is a step voltage represented by the length of the line 72 in Fig. 4b.

On short ranges the voltage step inherent in the circuit is increased by a suitable value $R_1$ of the resistor 60. On longer ranges the voltage step may be reduced by a suitable low value $R_3$ of resistor 64.

The resistor 62, in series with the deflection coil 63, comprises part of the load and makes it essentially resistive. This resistor is made as large as is consistent with sweep length and the available plate supply voltage $E_{bb}$. Its value may be switched to provide optimum characteristics on different ranges. Increasing the resistance $R_4$ of resistor 62 improves linearity, reduces plate dissipation, and reduces the dependence of circuit operation upon tube characteristics.

Capacitor 61 of value $C_2$ acts at the start of the sweep in the same way as the capacitor 20 in the circuit shown in Fig. 1.

Figure 5:
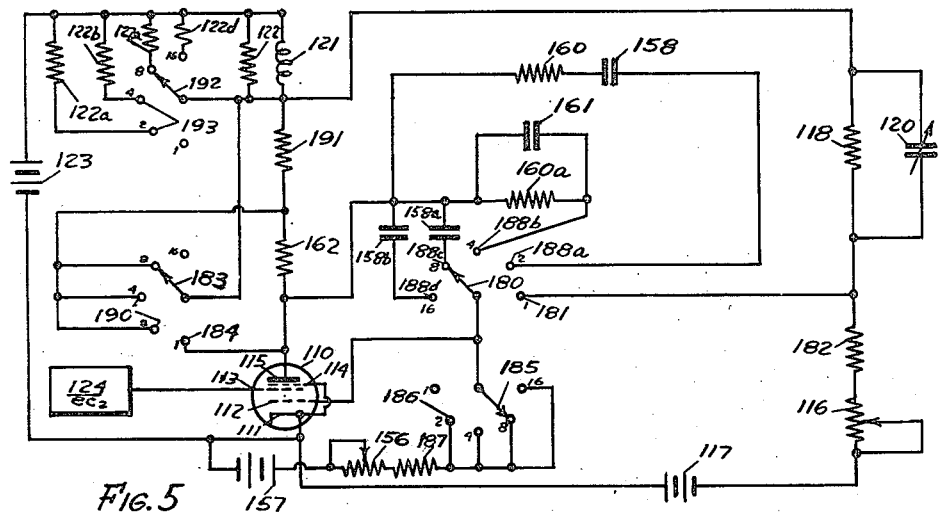
Fig. 5 is a schematic diagram of the circuits of Figs. 1 and 3 combined together with suitable switching.

Fig. 5 shows how the circuits of Figs. 1 and 3 may be combined to give a radar indicator having five ranges from 1 to 16 miles. In Fig. 5, the reference numeral 110 designates a pentode or tetrode with a cathode 111, a control grid 112, a screen grid 113, a suppressor grid 114 and an anode 115. The control grid 112 is connected to the cathode 111 through the arm of a switch 180, the one-mile range contact 181, resistors 182 and 116, and a source 117 of negative potential, in this case 300 volts. The grid 112 is also connected to the plate 115 through the arm of the switch 180 and the one-mile contact 181, a resistor 118 shunted by a capacitor 120, preferably adjustable, the arm of the switch 183 and the one-mile contact 184 on this switch. The grid 112 can also be connected to the cathode 111 through the arm of a switch 185 and any of the contacts 186 representing the 2, 4, 8 and 16 mile positions, a resistor 187, a variable resistor 156, and a source 157 of positive potential. The grid 112 is also connected to the plate 115 through the arm of the switch 180 and one of its 2, 4, 8 and 16 mile contacts 188a, b, c and d, capacitor 158 and resistor 160, for the two-mile range contact 188a, resistor 160a shunted by capacitor 161 for the four-mile range contact 188b, capacitor 158a for the eight-mile range contact 188c and capacitor 158b for the sixteen-mile range contact. The screen grid 113 is connected to the source 124 of gating pulses. The suppressor grid 114 is connected to the cathode 111. The plate 115 is connected to the cathode 111 through the one-mile range contact 184 on the switch 183, the deflection coil 121, shunted by a resistor 122 and a source of positive potential 123. The plate 115 can also be connected to the cathode 111 through the arm of the switch 183 and the 2, 4, and 8 mile contacts 190, a resistor 191, the deflection coil 121 shunted by the resistor 122 and also by one of the resistors 122a, b and c through the arm of a switch 192 and its 2, 4, and 8 mile contacts 193 and the source 123 of positive potential or through the resistors 162 and 191, the deflection coil 121 shunted by the resistor 122 and also by the resistor 122d through the arm of the switch 192, the sixteen-mile contact 194 and the source 123.

The circuit of Fig. 5 operates substantially like the circuit of Fig. 1 when the switches 180, 183, 185 and 192 are in the one-mile range position and like the circuit of Fig. 3 when the switches 180, 183, 185 and 192 are in any of the 2, 4, 8 or 16 mile positions. The only difference between these last-named positions is in the different values of capacity and resistance inserted in the appropriate portions of the circuit. The effect of varying these values of resistance and capacity is explained in the description of the operation of the circuit of Fig. 3.

Figure 6:
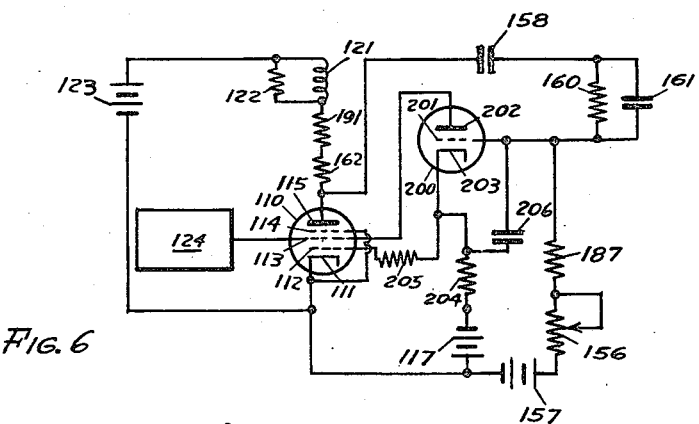
Fig. 6 is a modification of the circuit shown in Fig. 3.

Fig. 6 illustrates a modification of Fig. 3 in which a cathode follower 200 is added with its grid 201 connected to the plate 115 of pentode 110 through a resistor 160 shunted by a capacitor 161 and to cathode 203 through resistors 182 and 116, source 117 of positive potential and resistor 204. The cathode 203 is connected to the cathode 111 of the tube 110 through a resistor 204 and the source 117 and to the grid 112 of the tube 110 through a resistor 205 and is also coupled to the grid 201 through a capacitor 206. The plate 202 of the tube 200 is connected to the source 124 of gating pulses. The effect of the insertion of this cathode follower is to provide a source of voltage of low driving impedance for the grid of the sweep tube 110 which enables operation in its positive grid region in order to obtain higher peak sweep currents.

Figure 7:
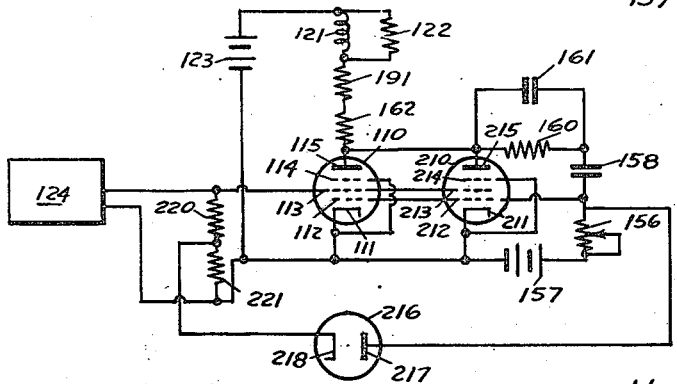
Fig. 7 is a further modification of the circuit shown in Fig. 3.

Additional sweep power can also be obtained by the addition of a second sweep tube 210 of the power type, as shown in Fig. 7, having a cathode 211, a grid 212, a screen grid 213, a suppressor grid 214, and a plate 215 connected to corresponding electrodes in tube 110. In order to hold the initial grid voltage at a level with respect to ground, a diode 216 is added with its plate 217 connected to the junction of the resistor 156 and capacitor 158 so that it is connected to the grids 112 and 212 of the tubes 110 and 210. The cathode 218 of this diode is connected to the junction of two resistors 220 and 221 connected in series across the output of the gating pulse generator 124.

In operation, before the gating pulse 70 of Fig. 4a appears, the cathode 218 of the diode is at a negative potential less than that of the screen grid 113. The plate 217 is at the slightly positive potential of the grid 112 as shown in Fig. 4c. The diode conducts bringing its plate 217 and the grids 112 and 212 substantially to the negative potential of the diode cathode, as shown by the dotted line 230. Upon the arrival of the gating pulse, the cathode 218 of the diode 216 becomes highly positive and the plate follows the grid to a considerably negative potential as shown by the negative-going line 231 in Fig. 4c. The diode ceases to conduct. However, upon the termination of the gating pulse the cathode 218 of the diode becomes slightly negative as before and the plate 217 tends to follow the grid in a positive direction as shown by the positive-going spike 76 in Fig. 4c. When this happens, the diode conducts and the grid is clamped to a potential sufficiently low that the diode can just conduct, holding the grid to the original negative potential represented by the line 232.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. In combination an electron discharge device having a cathode, a first and second grid and an anode, a source of positive potential, a deflection coil for a cathode ray tube connected in series with said source of potential and said anode, a resistor shunting said coil, a capacitor coupling said anode and said first grid, a resistor shunting said capacitor, and a source of initially negative but positive going pulses connected between the second grid and the cathode.

2. In combination an electron discharge device having a cathode, a first and second grid and an anode, a source of positive potential, a deflection coil for a cathode ray tube connected in series with said source of potential and said anode, a resistor shunting said coil, a pair of capacitors coupling said anode and said first grid, a resistor shunting one of said capacitors, and a source of initially negative but positive going pulses connected between the second grid and the cathode.

3. In combination an electron discharge device having a cathode, a first and second grid and an anode, a source of positive potential, a deflection coil for a cathode ray tube connected in series with said source of potential and said anode, a resistor shunting said coil, a capacitor coupling said anode and said first grid, a resistor shunting said capacitor, a source of initially negative but positive going pulses connected between the second grid and the cathode, and a uniconducting element connected between a portion of the output of the source of pulses and the first grid of the discharge device arranged to conduct when the grid is positive with respect to the source of pulses.

4. In combination an electron discharge device having a cathode, a first and second grid and an anode, a source of positive potential, a deflection coil for a cathode ray tube connected in series with said source of potential and said anode, a resistor in series with said coil, a resistor shunting said coil, a pair of capacitors coupling said anode and said first grid, a resistor shunting one of said capacitors, and a source of initially negative but positive going pulses connected between the second grid and the cathode.

5. In combination an electron discharge device having a cathode, a first and second grid and an anode, a source of positive potential, a deflection coil for a cathode ray tube connected in series with said source of potential and said anode, a resistor shunting said coil, a pair of capacitors coupling said anode and said first grid, a resistor shunting one of said capacitors, a source of positive potential connected to said first grid, and a source of initially negative but positive going pulses connected between the second grid and the cathode.

6. In combination an electron discharge device having a cathode, a first and second grid and an anode, a source of positive potential, a deflection coil for a cathode ray tube connected in series with said source of potential and said anode, a resistor shunting said coil, a pair of capacitors coupling said anode and said first grid, a resistor shunting one of said capacitors, a source of initially negative but positive going pulses connected between the second grid and the cathode, and a uniconducting element connected between a portion of the output of the source of pulses and the first grid of the discharge device arranged to conduct when the grid is positive with respect to the source of pulses.

7. In combination an electron discharge device having a cathode, a first and second grid and an anode, a source of positive potential, a deflection coil for a cathode ray tube connected in series with said source of potential and said anode, a resistor in series with said coil, a resistor shunting said coil, a pair of capacitors coupling said anode and said first grid, a resistor shunting one of said capacitors, a source of positive potential connected to said first grid, and a source of initially negative but positive going pulses connected between the second grid and the cathode.

8. In combination an electron discharge device having a cathode, a first and second grid and an anode, a source of positive potential, a deflection coil for a cathode ray tube connected in series with said source of potential and said anode, a resistor in series with said coil, a resistor shunting said coil, a pair of capacitors coupling said anode and said first grid, a resistor shunting one of said capacitors, a source of positive potential connected to said first grid, a source of initially negative but positive going pulses connected between the second grid and the cathode, and a uniconducting element connected between a portion of the output of the source of pulses and the first grid of the discharge device arranged to conduct when the grid is positive with respect to the source of pulses.

References Cited in the file of this patent

UNITED STATES PATENTS

| | | |
|---|---|---|
| 2,074,496 | Vance | Mar. 23, 1937 |
| 2,412,485 | Whiteley | Dec. 10, 1946 |
| 2,508,879 | Zagor | May 23, 1950 |
| 2,548,532 | Hedeman | Apr. 10, 1951 |
| 2,552,949 | Fleming-Williams | May 15, 1951 |
| 2,584,882 | Johnson | Feb. 5, 1952 |
| 2,594,104 | Washburn | Apr. 22, 1952 |